Sept. 30, 1941.   C. L. BRADFORD   2,257,327
NUT
Filed April 23, 1941

INVENTOR.
Carlos L. Bradford.
BY
Corbett, Mahoney + Miller
ATTORNEYS.

Patented Sept. 30, 1941

2,257,327

UNITED STATES PATENT OFFICE 2,257,327

NUT

Carlos L. Bradford, Coshocton, Ohio

Application April 23, 1941, Serial No. 389,881

4 Claims. (Cl. 85—32)

My invention relates to a nut. It has to do, more particularly, with a novel type of nut which is adapted to be applied to an ordinary threaded bolt.

At the present time, with the ordinary nut commonly in use, it is necessary to thread it on the end of the bolt and rotate it until it moves inwardly along the bolt to its final position. In removing the nut, it is necessary to use a proper wrench and rotate it a sufficient number of times to thread it outwardly along the bolt until it is completely removed therefrom. Thus, as is well known, considerable time and effort is required for applying the ordinary nut to a bolt or removing it therefrom. Furthermore, it often happens that the nut is "frozen" on the bolt and is very difficult to remove.

One of the objects of my invention is to provide a nut, adapted to be applied to an ordinary bolt, which can be quickly and easily removed under practically any conditions.

Another object of my invention is to provide a nut of the type indicated which also can be quickly and easily applied to the bolt.

Another object of my invention is to provide a nut which is of such a structure that it not only may be easily and quickly applied to or removed from the bolt but is of such a nature that when it is once applied to the bolt, it will not become accidentally displaced therefrom.

Another object of my invention is to provide a nut which is of a sturdy structure so that it can adequately withstand the torsional and compressive forces to which it will be subjected.

Another object of my invention is to provide a nut of the type indicated which is of a simple structure and will not be costly.

The preferred embodiment of my invention is illustrated in the accompanying drawing wherein similar characters of reference designate corresponding parts and wherein.

Figure 1:
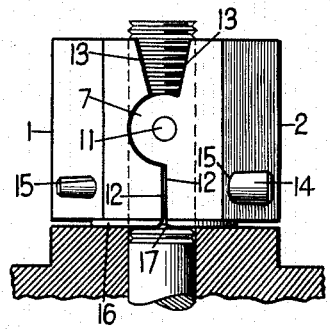
Figure 1 is a side elevational view of a nut made according to my invention showing it applied to a bolt.

With reference to the drawing, I have illustrated my nut as comprising rocker members 1 and 2. Members 1 and 2 may be formed of a suitable metal. Each of the members 1 and 2 has an angular exterior surface 3 and a substantially semi-circular inner surface 4. However, the upper portion of the inner surface 4 tapers outwardly towards its upper end. The lower end surface 4 is threaded, as indicated at 5. The member 1 is provided with a pair of integral ears 6 and the member 2 is provided with a pair of similar integral ears 7. Furthermore, member 1 is provided with a pair of substantially semi-circular sockets 8 disposed outside the ears 6 while member 2 is provided with a pair of similar sockets 9 within the ears 7.

The members 1 and 2 are adapted to be disposed with their inner surfaces 4 facing each other and with the ears 6 disposed within ears 7 and fitting into the sockets 9, the ears 7 fitting into sockets 8. The ears 6 and 7 are provided with aligning openings 10 adapted to receive hinge pins 11 which may be held in position in any suitable manner. Thus, the rocker members 1 and 2 are hingedly connected together and are provided with inner fitting portions at the hinge points. When the members 1 and 2 are assembled, they form a complete nut which has an angular outer surface and a circular inner surface.

The threaded portion 5 of members 1 and 2 is disposed below the hinge point of the nut. The meeting faces 12 of members 1 and 2 below the hinge points are substantially vertically disposed. However, the corresponding faces 13 above the hinge points are angularly disposed and diverge towards their upper ends. It will be apparent that this angular relationship of the surfaces 13 will permit swinging of the upper sections of members 1 and 2 towards each other and simultaneously spreading of the portions of members 1 and 2 below the hinge pins.

In order to lock the lower ends of the rocker members 1 and 2 together, I provide a tapered pin 14. This tapered pin is adapted to be forced into aligning, correspondingly tapered openings 15 formed in the lower portions of members 1 and 2 below the hinge points and extending transversely thereof. When the pin 14 is inserted in the openings 15 and is pushed into its final position, it will securely lock the members 1 and 2 together and will prevent relative rotation thereof.

Figure 2:
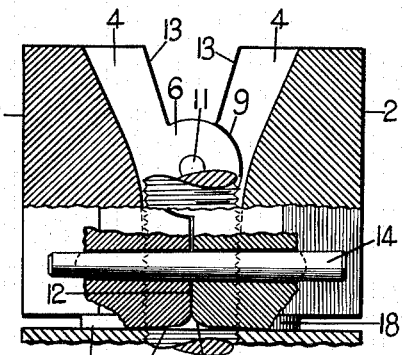
Figure 2 is a similar view with parts broken away for illustrative purposes and showing the nut before it has been tightened on the bolt.

Each of the members 1 and 2 has a semicircular projection or shoulder 16 on its lower surface. At the faces 12 where the shoulder 16 terminates the shoulder is beveled, as indicated at 17. The outer edges 18 of the shoulders 16 carried by the members 1 and 2 are so formed that they cooperate to produce a complete circle. When the pin 14 is in its final position, as shown in Figure 2, the faces 12 will be in contact with each other at their lower ends and the lower flat surfaces 19 will be at a slight angle relative to the horizontal. It will also be noted that the ears 6 and 7 are at such a height that they engage the top portions of sockets 9 and 8 so that upward pressure exerted on either of the members 1 and 2 will not be transmitted to the hinge pin 11.

Figures 5, 6:
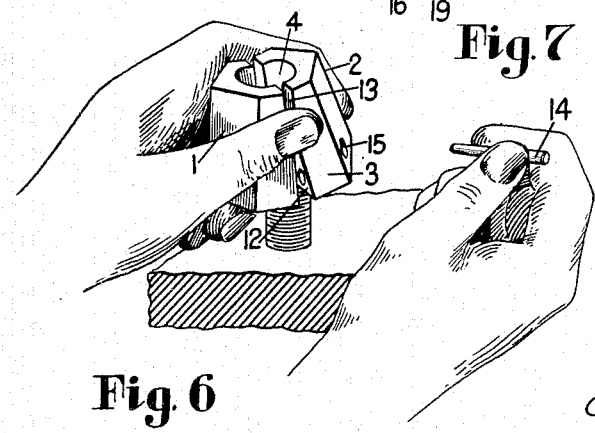
Figure 5 is a perspective view of the two main sections of the nut which have been disassembled.
Figure 6 is a perspective view showing how the nut may be applied to a bolt.

In using this nut, as indicated in Figure 6, the pin 14 is removed and the lower ends of members 1 and 2 are spread apart. The nut may then be slipped down over the bolt, and the pin 14 may be inserted and pushed or tapped in place. Then it is merely necessary to tighten the nut on the bolt. However, the main advantage lies in the ease with which the nut may be removed from the bolt. It is merely necessary to push the pin 14 out and swing the upper section of members 1 and 2 towards each other which is permitted because of the angular relationship of the surfaces 13 and the outwardly tapered upper portions of the surfaces 4. If the nut is "frozen" on the bolt, it is merely necessary to tap the upper ends of members 1 and 2 with a hammer to force them inwardly. The lower ends of members 1 and 2 will spread, permitting removal of the nut without the use of a wrench and without threading it along the bolt.

Figure 3:
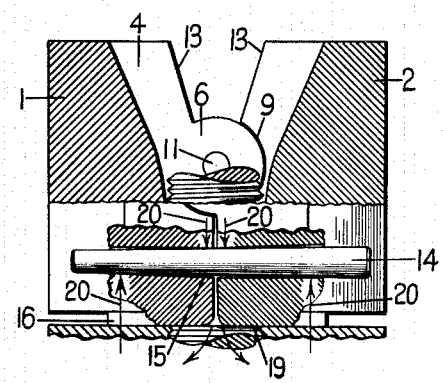
Figure 3 is a similar view showing the nut after it has been tightened on the bolt.
Figure 4:
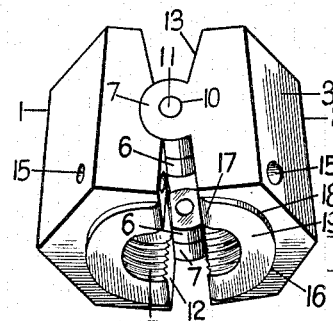
Figure 4 is a perspective view showing the nut before it is applied to the bolt.

In Figure 2 the nut is shown before it is tightened on the bolt. As previously stated, the surfaces 19 will be at a slight angle relative to the horizontal. However, when the nut is tightened into its final position the surfaces 16 will be horizontally disposed. In tightening the nut on the bolt, the lower ends of members 1 and 2 tend to spread slightly because of the inclination of surfaces 19 and, consequently, when the nut is in its final tight position and the surfaces 19 are horizontal, as in Figure 3, there will be set up a binding action on the pin 14 as indicated by the arrows 20. This binding action will serve to hold the pin 14 in position and prevent accidental displacement thereof by vibration. However, the pin can be readily forced from the openings 15 by tapping it with a hammer.

Figure 7:
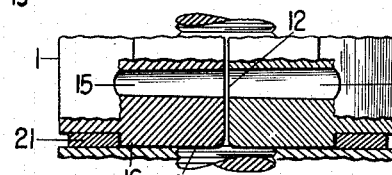
Figure 7 is a perspective view showing how the nut may be locked in position by the use of a washer.

As indicated in Figure 7, it is possible to use my nut without the pin 14. Instead a lock washer 21 may be disposed in surrounding relationship to the shoulder 16 to lock the rocker members 1 and 2 together. However, with this structure it will be necessary to give the nut one or more turns before being able to swing the rocker members apart.

It will be apparent from the above description that I have provided a nut having a number of advantages. The nut is particularly advantageous for use where it is desired to quickly disassemble a unit and reassemble it and where power operating wrenches are not available. For example, this nut would be particularly useful on airplane engines which must be disassembled and reassembled at frequent intervals and in short periods, particularly when the plane is away from its base.

Various other advantages will be apparent from the drawing and the following claims.

Having thus described my invention, what I claim is:

1. A nut comprising a pair of rocker members having interfitting portions intermediate their upper and lower ends which are pivotally connected together, each of said rocker members being of substantially semi-circular form in cross-section so that they will surround a bolt, the lower portions of said rocker members below the pivot point being provided with threads on the interior thereof, each of said rocker members having a lower surface disposed at an angle relative to the horizontal, and a tapered pin fitting into correspondingly tapered transverse openings formed in said rocker members to lock said members in position.

2. A nut comprising a pair of rocker members having interfitting portions intermediate their upper and lower ends, a pivot pin for connecting said interfitting portions together, said pivot pin being disposed substantially at right angles to the vertical axis of the nut, each of said rocker members being of substantially semi-circular form in cross-section so that they will surround the bolt, the lower portions of said rocker members below the pivot pin being provided with threads on the interior thereof, said interfitting portions of the rocker members contacting with each other at their upper edges to relieve strain from said pivot pins.

3. A nut of the type described comprising a pair of rocker members pivoted together intermediate their upper and lower ends for swinging movement about an axis substantially at right angles to the vertical axis of the nut, said rocker members being of such a form that they will surround a bolt, the lower ends of said rocker members being provided with threads on the interior thereof, and a transversely extending pin fitting into transverse aligning openings formed in said rocker members below the pivot point.

4. A nut comprising a pair of rocker members having interfitting portions intermediate their upper and lower ends which are pivotally connected together, each of said rocker members being of substantially semicircular form in cross-section so that they will surround the bolt, the lower portions of said rocker members below the pivot point being provided with threads on the interior thereof, each of said rocker members having a substantially semicircular projection formed thereon, and a washer surrounding both of the semicircular projections to lock the rocker members in position, the lower surfaces of said projections being disposed at a slight angle relative to the horizontal.

CARLOS L. BRADFORD.